Inventor
Robert A. Whitlock
By McCanna, Morsbach & Pillote
Atty's

April 17, 1962 R. A. WHITLOCK 3,029,949
CONTROL SYSTEM FOR WATER TREATMENT APPARATUS
Filed July 10, 1959 2 Sheets-Sheet 2

Inventor
Robert A. Whitlock.
By McCanna, Morsbach & Pillote
Atty's

United States Patent Office 3,029,949
Patented Apr. 17, 1962

3,029,949
CONTROL SYSTEM FOR WATER TREATMENT
APPARATUS
Robert A. Whitlock, Rockford, Ill., assignor to Aqua-Matic Inc., Rockford, Ill., a corporation of Illinois
Filed July 10, 1959, Ser. No. 826,365
8 Claims. (Cl. 210—134)

This invention relates to novel and useful improvements and control systems for water treatment apparatus.

Various important objects of this invention are to provide a control system of the type employing a flow reversing three-way valve, which system is arranged to effect flow in one direction through the treatment tank to drain during backwashing of the bed of exchange material and flow in the other direction through the treatment tank to drain during regeneration and rinsing of the bed of exchange material; which control system reduces the number of auxiliary valves which must be used in conjunction with the three-way valve to effect the aforementioned cycle of operation, and which control system is simple and economical in construction and reliable in operation.

These, together with various ancillary objects and advantages of this invention will be more readily appreciated as the same becomes better understood by reference to the following detailed description when taken in connection with the accompanying drawings wherein.

Figure 1:
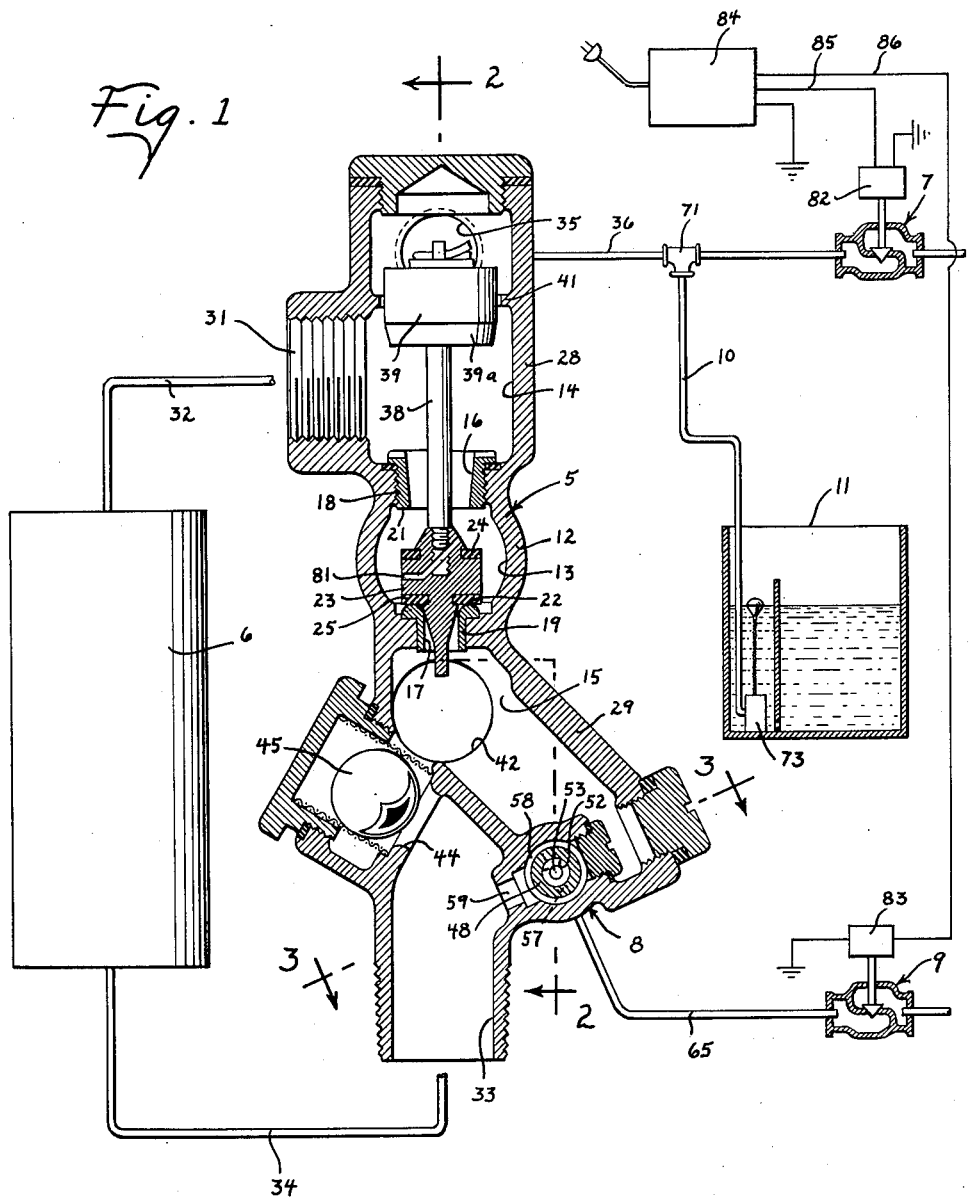
FIGURE 1 is a diagrammatic view of the control system of the present invention with the control valve shown in section and illustrating the same in its service position.
Figure 2:
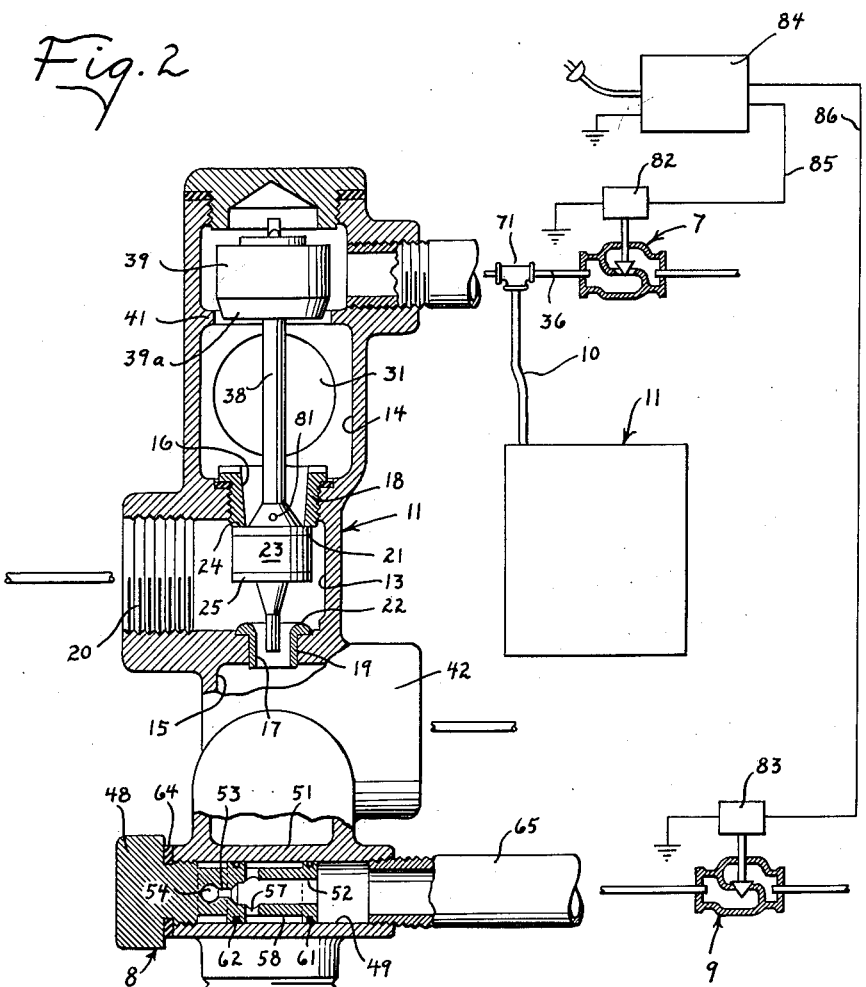
FIG. 2 is a fragmentary diagrammatic view of the control system with the main control valve broken away along the line 2—2 of FIGURE 1 and shown in section to illustrate details of construction.
Figure 3:
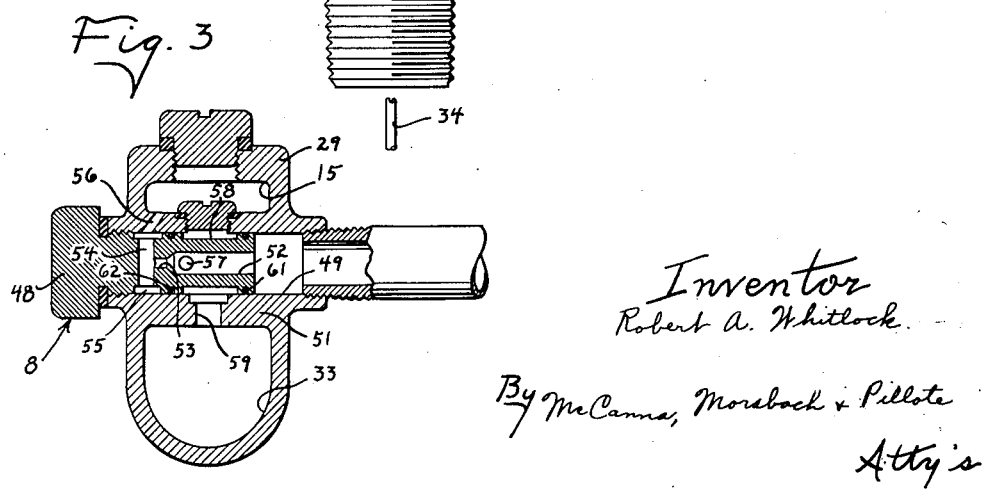
FIG. 3 is a sectional view taken on the plane 3—3 of FIGURE 1 and illustrating the ejector construction.

The control system of the present invention is arranged to regulate the flows of fluid to and from the treatment tank 6 during the various phases of a regeneration cycle and in particular is arranged to effect the flow of liquid downwardly through the treatment tank to service during the service run; upwardly through the treatment tank to drain during backwashing and downwardly through the treatment tank to drain during regeneration and rinsing of the bed of exchange material. In general, the flow control apparatus includes a fluid operated three-way valve 5 normally positioned as shown in FIG. 1 to pass fluid in one direction through the treatment tank 6; a first drain valve 7 operative when open to move the three-way valve to the position shown in FIG. 2 and reverse the direction of flow of fluid through the treatment tank 6 and an ejector 8 operative during backwashing to pass water from the reversing valve to the bottom of the treatment tank for flow upwardly therethrough to drain and operative, when a second drain valve 9 is opened, to withdraw fluid from the lower end of the treatment tank and discharge the same to drain. A regenerant line 10 is provided for feeding regenerant from the regenerant tank 11 to the upper end of the treatment tank 6 in response to the reduction in fluid pressure in the treatment tank which occurs when the ejector is operated.

The control valve 5 includes a casing 12 defining an inlet chamber 13 having an inlet passage 20 and spaced outlet ports 16 and 17. In the embodiment shown, the outlet ports are formed in fittings 18 and 19 respectively which are inserted into the casing and define opposed valve seats 21 and 22. A valve member 23 is disposed in the inlet chamber and has opposed faces 24 and 25 which cooperate with the seats 21 and 22. The valve member is normally urged, as by gravity, to a position shown in FIGURE 1 and, during service, fluid flows from the inlet 15 through the upper outlet port 16. The valve 5 also includes upper and lower flow chambers 14 and 15 formed by casing extensions 28 and 29. In the embodiment illustrated, the casing extensions are formed integrally with the valve casing 12, it being understood that the casing extensions may be formed separate therefrom and connected to the valve casing as by conduits. The upper flow chamber 14 is connected through a top outlet passage 31 to a conduit 32 leading to the top of the treatment tank 6. The lower flow chamber 15 is connected through a lower flow passage 33 and conduit 34 with the lower end of the treatment tank.

An upper drain passage 35 is formed in the casing extension 28 preferably at a level above the upper outlet passage 31, and is connected through a drain conduit 36 with the first drain valve 7. The valve member 23 is fluid operated from the position shown in FIG. 1, to its FIG. 2 position, and for this purpose has a stem 38 which extends upwardly through the port 16 and a head 39 attached to the upper end of the stem. The head extends closely adjacent to a peripheral flange 41 on the casing extension and located between the outlet passage 31 and the drain passage 35 so that the fluid flowing to the drain passage will impinge upon the head and raise the valve member. The lower edge of the head is beveled as indicated at 39a to provide a relatively larger flow passage around the head when the latter is in its fully raised position shown in FIG. 2.

During the normal service run, the drain valve 7 is closed and the valve member 23 is in its lowered position so that fluid flows through the upper port 16, through the upper outlet 31 and conduit 32 to the top of the treatment tank 6. The treated water from the bottom of the tank flows through conduit 34. In order to provide a supply of water during the regeneration of the bed of exchange material, the service outlet 42 is arranged to communicate with the lower chamber 15 so that hard water is supplied to service when the valve member is raised. A by-pass 44 is provided for communicating the lower flow passage 33 with the service outlet 42, and a check 45 controls flow through the by-pass. During service, the treated water flows from the conduit 34 through the lower flow passage 33 and by-pass 44 to the service outlet 42. During regeneration, the check valve 45 closes to prevent flow through the by-pass.

The ejector 8 may be of any conventional construction and as herein shown is formed in a unitary body 48 which is positioned in a transverse bore 49 formed in a boss 51 on the lower casing extension 29. The body 48 has a bore 52 extending inwardly from one end and forming a throat, and a counterbore 53 forming the ejector nozzle. The ejector also has a raw water inlet 54 which communicates through a peripheral groove 55 in the body 48 and through passage 56 in the boss 51 with the lower flow chamber 15. The ejector also includes a throat inlet 57 which communicates by way of peripheral groove 58 in the body and passage 59 in the boss 51 with the lower flow passage 33. O-rings 61 and 62 are provided for sealing the throat inlet from the outlet, and for sealing the raw water inlet from the throat inlet, respectively. The body 48 is threaded into the boss 51 and a gasket 64 is interposed between the head of the body and the end of the boss to seal the interface therebetween. The ejector outlet is connected to a drain pipe 65 which is threaded into the other end of the boss 51, and which drain pipe has the aforementioned second drain valve 9 therein.

During backwashing the drain valve 7 is open and the drain valve 9 is closed. Fluid from the inlet chamber 13 then flows through the lower port 17 and lower flow chamber 15 to the raw water inlet 54 of the ejector. The water passes through the nozzle 53 and out through the throat inlet ports 57 of the ejector and then through passage 59, lower flow passage 33, and conduit 34 to the bottom of the treatment tank. The backwash water flows upwardly through the treatment tank and out through conduit 38 to the drain line 36. During the brine injection phase of the regeneration cycle, the drain valve 7 is closed and the drain valve 9 is open so that fluid can flow from the raw water inlet 54 of the ejector through the nozzle 53 and into the throat 52 to drain. This draws fluid in through the throat inlet ports 57 of the ejector and reduces the pressure in the treatment tank below atmospheric pressure.

The regenerant line 10 is arranged to supply regenerant to the upper end of the treatment tank in response to the reduction in pressure in the tank below atmospheric pressure. This line may be connected at various different locations to supply fluid to the top of the treatment tank and as shown, is connecting to a T-fitting 71 in the upper drain line 36. Thus, the regenerant line is in direct open communication through the drain line 36 with the upper chamber 14, and also with the conduit 32 leading to the top of the treatment tank. When the ejector withdraws fluid from the treatment tank 6, the regenerant from the regenerant tank 11 is fed through the regenerant control valve 73 to the regenerant line 10 and flows into the top of the treatment tank, the effluent from the bottom of the treatment tank passing outwardly through the ejector to the lower drain line 65. The regenerant control valve 73 may be of any conventional construction which will close to prevent flow into the tank when the liquid reaches a preselected upper level and close to prevent flow from the tank when the liquid reaches a preselected lower level to thereby dispense a measured quantity of regenerant from the tank. The particular control valve illustrated is of the type shown in the patent to Whitlock No. 2,716,422.

Provision is made for diluting the regenerant from the line 10, prior to introduction of the same into the treatment tank. For this purpose, a passage is provided for feeding a restricted supply of water from the inlet chamber 13 to the upper chamber 14. The passage 81 is advantageously formed in the valve member 23 to extend from a point intermediate the seats 24 and 25, to a point at the upper side of the valve member radially inwardly of the upper seat 24. When the valve member is in its raised position, a restricted flow of water passes through the passage 81 and mixes with the brine entering through the brine line 10 to dilute the same. When the brine control valve 73 shuts off the flow of brine, the liquid flowing through the passage 81 will pass through the treatment tank 6 to rinse the bed of exchange material therein.

The drain valves 7 and 9 are conveniently solenoid operated as by solenoids 82 and 83 and are operated in timed relation with each other by a common timer 84. The timer includes a first control circuit 85 connected to the solenoid 82 and a second control circuit 86 connected to the solenoid 83. The timer may be of any conventional construction which is adapted to energize the solenoid 82 through the circuit 85, for a time interval corresponding to the duration of the backwash phase of the regeneration cycle, and to thereafter deenergize solenoid 82 and energize the solenoid 83 for a time interval corresponding to the brining and rinse phases of the regeneration cycle. In order to prevent movement of the valve member 23 away from its upper seated position between the backwashing and brining phases of the cycle, the timer is preferably arranged so as to energize solenoid 83 and open valve 9 shortly before de-energizing solenoid 82 to close valve 7.

From the foregoing it is thought that the operation and construction of the control system will be readily understood. During service, the valve member 23 is in the position shown in FIGURE 1 and the drain valves 7 and 9 are closed. Fluid will then flow from the inlet 20 through the upper port 16 and downwardly through treatment tank 6, conduit 34, and by-pass 44 to the service outlet 42. During regeneration, the drain valve 7 is first opened to thereby move the valve member 23 to its raised position shown in FIG. 2. Fluid then flows from the inlet passage, downwardly through the lower chamber 15, to the raw water inlet passage of the ejector 8. The raw water from the inlet passes through the nozzle 53, and through the throat inlet ports 57 and passage 59 to the conduit 34 leading to the bottom of the treatment tank. The backwash water from the upper end of the tank passes through conduit 32 to the drain line 36. Thereafter, the drain valve 9 is opened and the valve 7 is closed to start the brine phase of the regeneration cycle. Opening of the drain valve 9 permits water to flow from the raw water inlet 54 of the ejector through the nozzle 53 and throat 52 to the outlet. The ejector then operates to eject fluid from the bottom of the treatment tank 6 and reduces the pressure at the upper side of the valve member 23 to both hold the valve member in its raised position and to draw regenerant in through the line 10. The regenerant mixes with the water flowing through passage 81 and the diluted regenerant is fed into the top of the treatment tank and passes outwardly from the bottom through the ejector 8. When the regenerant control valve 73 terminates the flow of brine, the water flowing through passage 81 continues to rinse the bed of exchange material until the drain valve 9 is again closed. At that time, the pressures on opposite sides of the valve member 23 become equalized and the valve member then moves downwardly under gravity to its lowered position shown in FIGURE 1 to return the treatment apparatus to service.

I claim:

1. In combination with a water treatment apparatus having a treatment tank, a control system comprising, valve casing means defining an inlet chamber having an inlet opening and first and second spaced outlet ports, a first flow passage for communicating said first outlet port with the upper end of said treatment tank, a two-position valve member in said chamber normally positioned to block flow through said second outlet port, an ejector having a raw water inlet, a throat inlet, and an outlet, a second passage for communicating said throat inlet with the lower end of said treatment tank, a third passage communicating said second outlet port with said raw water inlet, a first drain passage connected to pass liquid from the upper end of the treatment tank to drain, a second drain passage communicating with said outlet of the ejector, first and second drain valves in said first and second drain passages, means responsive to the opening of said first drain valve for moving said valve member from a position closing said second port to a position opening said second port and closing said first port to thereby supply liquid from the inlet chamber to said third passage, a regenerant line communicating with said first passage, said second drain valve being operative upon opening to pass liquid from said outlet of said ejector whereby liquid flows from said third passage through said ejector to eject liquid from said second passage and draw regenerant from said regenerant line into said first passage for flow to the treatment tank.

2. In combination with a water treatment apparatus having a treatment tank, a control system comprising, valve casing means defining an inlet chamber having an inlet opening and first and second spaced outlet ports, a first flow passage for communicating said first outlet port with the upper end of said treatment tank, a two-position valve member in said chamber normally positioned to block flow through said second outlet port, an ejector having a raw water inlet, a throat inlet, and an outlet, a second passage for communicating said throat inlet with the lower end of said treatment tank, a third passage communicating said second outlet port with said raw water inlet, a first drain passage connected to pass liquid from the upper end of the treatment tank to drain, a second drain passage communicating with said outlet of the ejector, first and second drain valves in said first and second drain passages, means responsive to the opening of said first drain valve for moving said valve member from a positive closing said second port to a position opening said second port and closing said first port to thereby supply liquid from the inlet chamber to said third passage, a regenerant line communicating with said first passage, said second drain valve being operative upon opening to pass liquid from said outlet of said ejector whereby liquid flows from said third passage through said ejector to eject liquid from said second passage and draw regenerant from said regenerant line into said first passage for flow to the treatment tank, and means for mixing water with the regenerant entering said first flow passage to dilute the regenerant as it flows to the treatment tank.

3. In combination with a water treatment apparatus having a treatment tank, a control system comprising, valve casing means defining an inlet chamber having an inlet opening and first and second spaced outlet ports, a first flow passage for communicating said first outlet port with said treatment tank, a two-position valve member in said chamber normally positioned to block flow through said second outlet port, an ejector having a raw water inlet, a throat inlet, and an outlet, a second passage for communicating said throat inlet with said treatment tank, a third passage communicating said second outlet port with said raw water inlet, a first drain passage communicating with said first flow passage, a second drain passage communicating with said outlet of the ejector, first and second drain valves in said first and second drain passages, means responsive to the opening of said first drain valve for moving said valve member from a position closing said second port to a position opening said second port and closing said first port to thereby supply liquid from the inlet chamber to said third passage, a regenerant line communicating with said first passage, said scond drain valve being operative upon opening to pass liquid from said outlet of said ejector whereby liquid flows from said third passage through said ejector to eject liquid from said second passage and draw regenerant from said regenerant line into said first passage for flow to the treatment tank, and passage means operative when said valve member is in a position closing said first outlet port for passing a restricted flow of liquid from said inlet opening to said first flow passage.

4. The combination of claim 3 wherein said passage is formed in said valve member.

5. In combination with a water treatment apparatus having a treatment tank, a control system comprising, valve casing means defining an inlet chamber having an inlet opening and first and second spaced outlet ports, a first flow passage for communicating said first outlet port with said treatment tank, a two-position valve member in said chamber normally positioned to block flow through said second outlet port, an ejector having a raw water inlet, a throat inlet, and an outlet, a second passage for communicating said throat inlet with said treatment tank, a third passage communicating said second outlet port with said raw water inlet, a first drain passage communicating with said first flow passage, a second drain passage communicating with said outlet of the ejector, first and second drain valves in said first and second drain passages, means responsive to the opening of said first drain valve for moving said valve member from a position closing said second port to a position opening said second port and closing said first port to thereby supply liquid from the inlet chamber to said third passage, a regenerant line communicating with said first passage, said second drain valve being operative upon opening to pass liquid from said outlet of said ejector whereby liquid flows from said third passage through said ejector to eject liquid from said second passage and draw regenerant from said regenerant line into said first passage for flow to the treatment tank, a service outlet communicating with said second outlet port, a by-pass communicating at one end with said service outlet and at the other end with said second passage, and a check valve in said by-passage operative to open and permit flow from said second passage to said service outlet.

6. A control system for a water treatment apparatus comprising a valve casing having an inlet chamber and first and second outlet chambers, means in said valve casing defining first and second outlet ports between said inlet chamber and said first and second outlet chambers respectively, a two-position valve member in said inlet chamber for controlling flow through said outlet ports and normally positioned to block flow through said second outlet port, a first outlet passage communicating with said first chamber, a second outlet passage, an ejector having a raw water inlet, a throat inlet, and an outlet, a first passage means communicating said raw water inlet of said ejector with said second outlet chamber, a second passage means communicating said throat inlet of said ejector with said second outlet passage, first and second drain passages respectively communicating with said first chamber and said outlet of said ejector, first and second drain valves in said first and second drain passages respectively, means responsive to opening of said first drain valve for moving said valve member to a position blocking flow through said first outlet port and opening said second outlet port to thereby supply liquid from the inlet chamber to said first passage, said second drain valve being operative when closed to block flow from the outlet of the ejector whereby liquid from said second outlet chamber flows into the raw later inlet of the ejector and out of the throat inlet into said second outlet passage, a regenerant line communicating with said first outlet chamber, said second drain valve being operative upon opening to pass liquid from the outlet of the ejector whereby liquid flows from said first passage means through said ejector to eject liquid from said second outlet passage.

7. The combination of claim 6 including means for passing a restricted flow of water from said inlet chamber to said first outlet chamber when said valve member is in a position blocking flow through said first outlet port.

8. A control system for a water treatment apparatus comprising a valve casing having an inlet chamber and top and bottom outlet chambers disposed respectively above and below said inlet chamber means in said valve casing defining vertically aligned upper and lower outlet ports between said inlet chamber and said top and bottom outlet chambers respectively, a two-position valve member for controlling flow through said outlet ports normally positioned to block flow through said lower outlet port, an upper flow passage communicating with said upper chamber, a lower flow passage, said casing having means located between said bottom outlet chamber and said lower flow passage defining a horizontally disposed sleeve opening at opposite ends thereof externally of the casing, said sleeve having a first passage means communicating said bottom outlet chamber with the interior of the sleeve adjacent one end thereof, said sleeve having a second passage means therein communicating the lower flow passage with the interior of the sleeve intermediate the ends thereof, an ejector body in said sleeve closing said one end thereof and defining a nozzle between said first and second passage means and a throat between said second passage means and the other end of the sleeve, a first drain passage communicating with said top chamber, a second drain passage communicating with said other end of the sleeve, first and second drain valves in said first and second drain passages normally blocking flow through the respective drain passages, means responsive to opening of said first drain valve for moving said valve member to a position blocking flow through said upper outlet port and opening said lower outlet port to thereby supply liquid from said inlet chamber to said first passage means, said second drain valve being operative when closed to block flow from the other end of said sleeve whereby liquid flows from said bottom outlet chamber through the ejector nozzle and through said second passage means to the lower flow passage, and means for sequentially opening said first and second drain valves, said second drain valve being operative upon opening to pass liquid from the outlet of the ejector throat whereby liquid flows through the nozzle and through the throat of the ejector to eject liquid from said lower flow passage.

References Cited in the file of this patent
UNITED STATES PATENTS

| | | |
|---|---|---|
| 2,610,945 | Purcell et al. | Sept. 16, 1952 |
| 2,751,347 | Miller | June 19, 1956 |
| 2,782,726 | Perrin | Feb. 26, 1957 |
| 2,855,944 | Albin | Oct. 14, 1958 |

UNITED STATES PATENT OFFICE
CERTIFICATE OF CORRECTION

Patent No. 3,029,949

April 17, 1962

Robert A. Whitlock

It is hereby certified that error appears in the above numbered patent requiring correction and that the said Letters Patent should read as corrected below.

Column 5, line 10, for "positive" read -- position --; line 44, for "scond" read -- second --; column 6, line 53, after "chamber" insert a comma.

Signed and sealed this 14th day of August 1962.

(SEAL)
Attest:

ERNEST W. SWIDER
Attesting Officer

DAVID L. LADD
Commissioner of Patents